(12) United States Patent
Zhdankin et al.

(10) Patent No.: US 6,757,899 B2
(45) Date of Patent: Jun. 29, 2004

(54) DYNAMIC CORBA GATEWAY FOR CORBA AND NON-CORBA CLIENTS AND SERVICES

(75) Inventors: Aleksandr V. Zhdankin, Melbourne Beach, FL (US); Aleksey P. Dolgov, Nizhny Novgorod (RU)

(73) Assignee: Harris Corporation, Melbourne, FL (US)

( * ) Notice: Subject to any disclaimer, the term of this patent is extended or adjusted under 35 U.S.C. 154(b) by 193 days.

(21) Appl. No.: 09/976,244

(22) Filed: Oct. 11, 2001

(65) Prior Publication Data

US 2003/0074485 A1 Apr. 17, 2003

(51) Int. Cl.⁷ .............................................. G06F 3/00
(52) U.S. Cl. ...................................................... 719/315
(58) Field of Search ......................................... 719/315

(56) References Cited

U.S. PATENT DOCUMENTS

| | | | | |
|---|---|---|---|---|
| 5,862,328 A | 1/1999 | Colyer | ................... | 395/200.33 |
| 5,974,416 A | 10/1999 | Anand et al. | ................. | 707/10 |
| 5,983,233 A | 11/1999 | Potonniee | ................... | 707/103 |
| 6,012,067 A | 1/2000 | Sarkar | ........................ | 707/103 |
| 6,049,819 A | 4/2000 | Buckle et al. | ............... | 709/202 |
| 6,061,729 A | 5/2000 | Nightingale | ................. | 709/228 |
| 6,138,110 A | 10/2000 | Jahn et al. | ...................... | 707/1 |
| 6,192,250 B1 | 2/2001 | Buskens et al. | ............ | 455/463 |
| 6,222,533 B1 | 4/2001 | Notani et al. | ............... | 345/329 |
| 6,222,916 B1 | 4/2001 | Cameron et al. | ........... | 379/207 |
| 6,229,803 B1 | 5/2001 | Bog et al. | .................... | 370/352 |
| 6,266,695 B1 | 7/2001 | Huang et al. | ............... | 709/223 |
| 6,282,580 B1 | 8/2001 | Chang | ......................... | 709/316 |
| 2001/0027439 A1 | 10/2001 | Holtzman et al. | ............ | 705/39 |
| 2001/0027535 A1 | 10/2001 | Sawai et al. | ................... | 714/4 |

OTHER PUBLICATIONS

Jepsen, T., "*SOAP Cleans Up Interoperability Problems on the Web*," IEEE, Jan. 2001, pp. 52–55.

Fatoohi, R., et al., "*Migration of DCE Applications into CORBA and SOAP Environments*," Software—Practice and Experience, Mar. 2002, 18 pages.

*Primary Examiner*—Meng-Al T. An
*Assistant Examiner*—Phuong N. Hoang
(74) *Attorney, Agent, or Firm*—Allen, Dyer, Doppelt, Milbrath & Gilchrist, P.A.

(57) ABSTRACT

A dynamic CORBA gateway allows CORBA services to be exposed to non-CORBA clients and non-CORBA services to be exposed to CORBA clients over a Simple Object Access Protocol (SOAP) with a SOAP upstream and downstream interface and Virtual CORBA Service Object.

18 Claims, 5 Drawing Sheets

DYNAMIC CORBA GATEWAY FOR CORBA AND NON-CORBA CLIENTS AND SERVICES

FIELD OF THE INVENTION

This invention relates to the field of distributed object computing in a client-server environment, and more particularly, this invention relates to a Common Object Request Broker Architecture (CORBA) used in distributed object computing.

BACKGROUND OF THE INVENTION

The increase in the number of communication industries, internet technologies, and worldwide web (WWW) users has resulted in a large number of programs using Object Oriented Programming (OOP) techniques. This type of programming is applicable to client-server computing using a distributed computing model where client applications request services from a server. The client applications and server processes typically operate on different computers interconnected to each other via a network, such as the internet. As is well known, the client application sends messages to the server via the network, while the server or program listens for client requests that are transmitted back via the network. The servers receive requests and perform actions.

In distributed object computing and object-oriented programming, objects are pieces of software that encapsulate an internal state and make it accessible through an interface, including object operations and attributes that are remotely accessible. A naming service can be used to connect portions of the interface. Clients, in turn, invoke operations on the remote object, which acts as a server. Objects belong to classes that are incrementally modified through inheritance. Examples of well-known object-oriented languages using these types of objects include Java or C++. The objects are collections of operations that share a state, where the operations determine the messages (or calls) to which the object can respond. This shared state is hidden from the outside world and only accessible to the objects operations.

One key aspect of object oriented programming is the reuse of programming effort by the reuse of sub-classes. Physical resources can have components that can be modeled in an object oriented manner and this programming effort can be re-used. Different programs, such as Java or C++, enable direct reuse of classes, but usually only if the same language can be bound or linked together. With the rise of the internet and larger communications networks, control and data processing functions are distributed among many geographically spaced computers at different locations making control over interfacing and communication among the different physical devices problematic.

Internet applications are becoming increasingly more difficult to communicate with each other because different machines with one architecture and code must communicate with other machines that are built around different architectures and codes. In response to this problem, the Object Management Group (OMG) has developed the Common Object Request Broker Architecture (CORBA) specification, which is a protocol for interprocess communication in a heterogenous environment. This infrastructure allows objects to converse independent of specific platforms and techniques used to implement the objects. As a result, there is interoperability between objects and those built-in, different languages that operate on different machines in a heterogenous distributed environment.

The CORBA architecture uses an Interface Definition Language (IDL), which is a declarative language similar to C++. It includes interfaces that are similar to classes of interface inheritance with input and output arguments and data types that are passed along with an operation. The Interface Definition Language declares remotely accessible server objects in a platform in programming language-neutral manner without implementation. The CORBA architecture also includes an Object Request Broker (ORB), which allows a client to communicate to an object through an object reference that acts as a pointer. The Object Request Broker finds a server object for a client request and prepares the object to receive the request, transmit the request from the client to the server object, and return output arguments back to the client application. Thus, an Object Request Broker provides an object-oriented Request Procedure Call (RPC) facility.

Other elements of the CORBA architecture include a Portable Object Adaptor (POA), Dynamic Invocation Interface (DII), Internet Inter-ORB Protocol (IIOP), and an Interface and Implementation Repository, as known to those skilled in the art.

One of the drawbacks of most CORBA architectures is that once the definition of the interface application provides or uses has changed, it should be rebuilt in order to work with the new interface even if the dynamic invocation is used. Opposite to programming languages, such as C++ and Java, usually used to build CORBA clients and servers, use of scripting language does not require extra compilation steps. The changes made to interfaces obtain instant support by script(s) modification.

There are some prior art CORBA gateways that approach this problem. Some scriptable interface specifications are supported by the Object Management Group. For example, one CORBA script language implementation allows CORBA applications (or services) to be revealed to a non-CORBA client. This type of CORBA universal gateway has been used before and is not tied to a particular scripting language. The CORBA object is serialized to HTML or a Simple Object Access Protocol (SOAP) and published. There are also several implementations of Extensible Markup Language (XML) to CORBA bridges. These capabilities, however, are more restrictive and are not used for dynamic CORA systems implementation.

It is desirable, however, that a more sophisticated CORBA gateway system would allow a server and scripting language to be implemented such that a CORBA client can accept this server from the non-CORBA device or program.

SUMMARY OF THE INVENTION

The present invention is advantageous and allows a service that is not specified through a Common Object Request Broker Architecture (CORBA) to be exposed to a client that is CORBA specified. A SOAP request can be prepared by interactive scripting as part of a client's business logic function that is operable via a SOAP interface. References can be created and maintained to virtual CORBA services via a virtual CORBA service object. The virtual CORBA services can be addressed by a set of HTTP Uniform Resource Locators (URL's). The references can be exposed as a monolithic CORBA service. The CORBA name value list data types can be serialized SOAP messages. An Internet Inter-ORB Protocol (IIOP) callback can be generated using a Simple Object Access Protocol (SOAP) message.

In yet another aspect of the present invention, Interface Definition Language (IDL) method calls can be translated to the SOAP messages. A specified method implementation HTTP uniform resource locator can also be transmitted via a virtual CORBA service object that forms a CORBA gateway.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
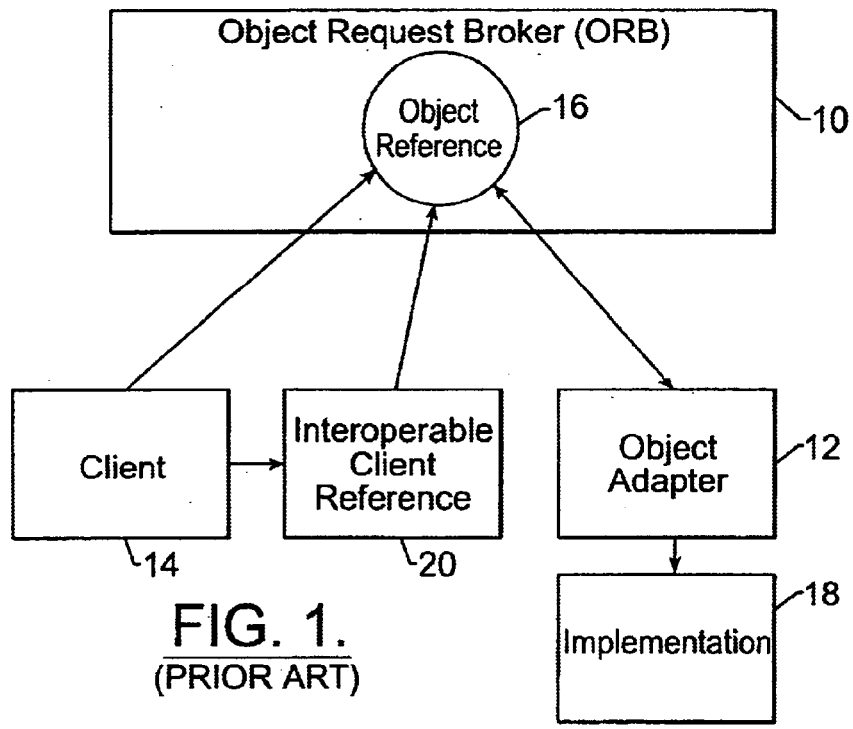
FIG. 1 is a high level block diagram showing a standard Object Request Broker (ORB).

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously provides a dynamic CORBA gateway that allows a CORBA service to be exposed to a non-CORBA client, and a non-CORBA service to be exposed to a CORBA client. An Internet Inter-ORB Protocol (IIOP) callback occurs using a Simple Object Access Protocol (SOAP) message. A Dynamic Client Business Logic function has a script that prepares a SOAP request and is operable with a SOAP upstream interface, a SOAP downstream interface, and a Virtual CORBA Service Object (VCSO). Pluggable dynamic modules for service implementation are operable with the SOAP downstream interface using the Simple Object Access Protocol.

For purposes of background, a brief description of a CORBA architecture and Simple Object Access Protocol (SOAP) is first described followed by a detailed description of the present invention.

It is well known that the CORBA architecture includes a series of standards and protocols to allow interprocess communication in a heterogenous environment of a large communications network such as the internet, enterprise, or similar networks. Applications can be written easily for many different operating systems at once in different languages using CORBA, thus, making CORBA one of the more popular interprocess communication techniques. It was developed as part of the Object Management Group (OMG). In CORBA, an Object Request Broker (ORB) is used to send requests between different applications. As is known to those skilled in the art, the CORBA specification defines the conventions and protocols that are followed by CORBA implementations. Vendors and software developers translate the specification into a working implementation. As a result of its general applicability, the CORBA specification has been created for many different operating systems, including the popular C++ and Java applications. Any CORBA implementation usually matches the defined interfaces and defined protocols, allowing it to communicate with other CORBA implementations.

As noted before, CORBA applications use objects that reside on different computers used throughout a distributed computing environment. These objects perform duties defined by their implementation. Objects act as servers in the system and can move as required. The client communicates to an object via an object reference, which acts as a pointer to the object to allow requests for operations and data access to be sent from the client to the server via the Object Request Broker (ORB).

Every object on an ORB has a code written to perform tasks on a server machine, thus doing the object work. This code can be in any language and can perform tasks supported by an operating system and hardware. A request reaches an ORB and is passed to a Portable Object Adapter (POA), forming a link between the object's implementation and its presence on the ORB. The Portable Object Adapter informs the ORB that any requests for the new object reference are routed to it. A client can receive an object reference using Interoperable Object References (IOR) and a naming service. Every object on an ORB includes an IOR that acts as a global identifier string to identify the machine in which the associated object is located and the interface the particular object supports. A client can receive a reference to an object via the naming service.

FIG. 1 shows a prior art, standard ORB 10 and object adapters 12. The client 14 has an object reference 16 generated from a server's IOR. Thus, the object adapter 12 is operable with the implementation 18 and connects to the object reference 16 of the ORB. It is operable with the client and Interoperable Client Reference 20. Always associated with the CORBA architecture is the Interface Definition Language (IDL), which defines the public interfaces to various objects in the system, while also allowing definition of core data types. A CORBA implementation usually comes with one or more IDL compilers that are operable with stub and skeleton files, which are language and ORB-dependent. The IDL file generates stubs and skeletons for each language and ORB implementation. Stubs are generated by a compiler and used in client processes to communicate with a server. Skeleton files, on the other hand, are the converse of stubs, and receive requests from an ORB, call a proper implementation, and return results.

Figure 2:
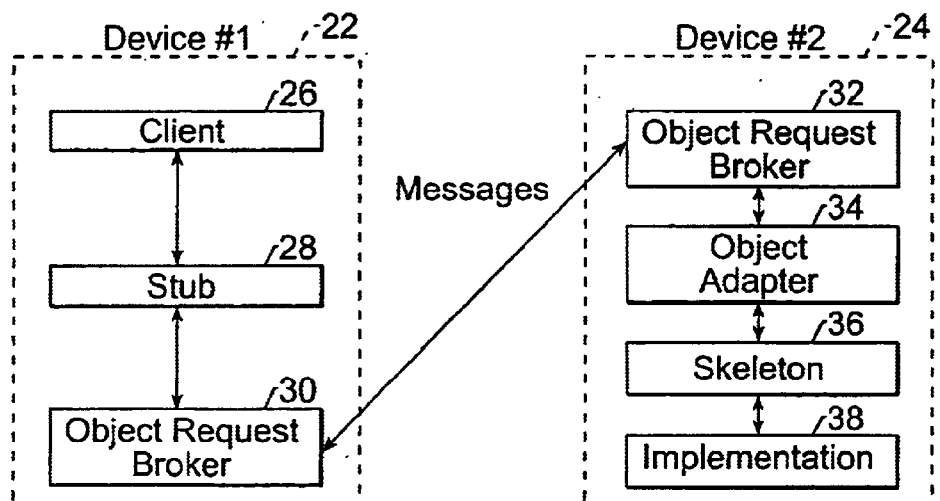
FIG. 2 is another high level block diagram illustrating a standard CORBA infrastructure implemented in a communications network.

FIG. 2 shows a CORBA system architecture with a first and second device 22, 24 and a client 26 that is operable with the stub file 28 and ORB 30, and uses an Internet Inter-ORB Protocol (IIOP) message to define a transport layer for sending messages as part of the general inter-ORB protocol over TCP/IP to the second device 24. It also includes an ORB 32, object adapter 34, skeleton files 36, and implementation 38. The IIOP maps messages to TCP/IP messages.

As part of the object adapter 34, operations are exported to create object references to register and activate server objects and authenticate requests. A server can install a reference in a name server such that a client can retrieve the reference and invoke the server. The Dynamic Invocation Interface defines the functions for creating request messages and delivering them to server objects. The Internet Inter-ORB Protocol is a simplified RPC protocol that invokes server objects via the internet. A CORBA Interface Repository can be formed as a database containing type information for interfaces available in a CORBA system architecture.

The present invention also uses a Simple Object Access Protocol (SOAP) upstream interface and downstream interface with an Internet Inter-ORB Protocol (IIOP) callback over the SOAP. SOAP is often used in current worldwide web development and its most common form is an Apache implementation, as known to those skilled in the art. SOAP is a protocol useful in distributed architecture that allows information exchange over HTTP (Hypertext Transfer Protocol), which is the standard method of publishing information as hypertext in HTMP (Hypertext Markup Language) format on the internet. SOAP is advantageous when different firewalls are encountered. Also, it is typically not necessary when using SOAP to have sockets listening on different ports. As known to those skilled in the art, the SOAP specification includes three components: (1) a SOAP envelope; (2) a set of encoding rules; and (3) a means of interaction between a request and response. These three components allow error handling, support for encodings, serialization of custom parameters via a serializer, and HTTP use to make it advantageous as a distributed protocol.

The SOAP envelope provides information about the message that is being encoded in a SOAP payload, including data about the receiver and sender, and details about the message. The header of a SOAP envelope can specify how a message is to be processed. This is different from a standard XML-RPC call, where the messages and coding are wrapped in a single XML fragment.

SOAP also allows the encoding of user-defined data types. In an RPC and XML-RPC call, encoding only occurs for a predefined set of data types. In SOAP, on the other hand, XML schemes are used to specify new data types that can be represented in XML as part of a SOAP payload. Thus, any data type can be encoded in a SOAP message that could logically be described in an XML scheme using the Extensible Markup Language, allowing HTML to be interoperable on the worldwide web. In SOAP, a call object is resonant in memory and set with the method to invoke the encoding style and parameters. Various parameters can be set and can provide fault responses. A SOAP API can communicate with the server and receive SOAP messages. It is also possible to run a SOAP server, which can receive messages from a SOAP client. It is possible to use SOAP-RPC or SOAP messaging.

Figure 3:
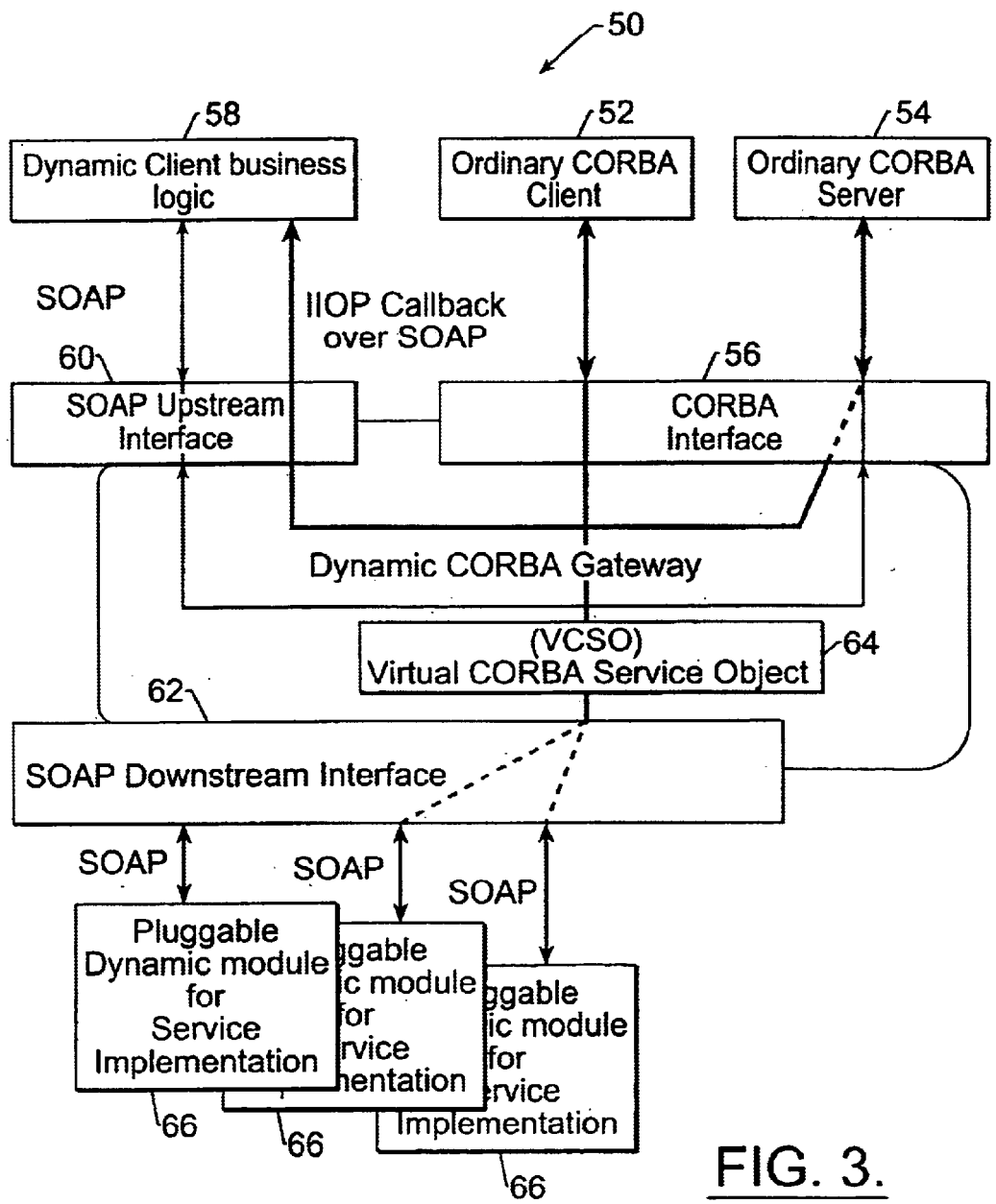
FIG. 3 is a high level block diagram of the dynamic CORBA gateway of the present invention, which creates and maintains references to virtual CORBA services that can be addressed by a set of HTTP Uniform Resource Locators (URL's) and exposed to the CORBA system as a monolithic CORBA service.

Referring now to FIG. 3, there is illustrated in block diagram the dynamic CORBA gateway system 50 of the present invention, showing in detail various components of the dynamic CORBA gateway that creates and maintains references to virtual CORBA services, where the service can be addressed by a set of Hypertext Transfer Protocol (HTTP) Uniform Resource Locators (URL's) and exposed to the CORBA system as a monolithic CORBA service. The various elements include the ordinary CORBA client 52 and ordinary CORBA server 54 that communicate with each other through a standard CORBA interface 56. A Dynamic Client Business Logic function 58 includes software logic with scripting to form an interactive script. This can be developed by techniques known to those skilled in the art. It communicates using the Simple Object Access Protocol (SOAP) via a SOAP upstream interface 60 that is operable with the CORBA interface 56. A SOAP downstream interface 62 is also operable with the CORBA interface. The Dynamic Client Business Logic function 58 includes the scripting that prepares the SOAP request as a simple text message in an XML language, and sends it over the dynamic CORBA gateway to the ordinary CORBA server 54. This client may implement the CORBA objects which can be an IIOP callback over SOAP, and thus, called by the CORBA server as if they were CORBA implemented. A CORBA object makes the CORBA call transfers to SOAP call, and the client is called using the SOAP protocol to expose the CORBA to a non-CORBA client. The Virtual CORBA Service Object (VCSO) 64 is similar to a Portable Object Adapter, and thus, separates the CORBA, but allows implementation using different languages. It communicates through the SOAP protocol to the SOAP downstream interface 62 to expose pluggable dynamic modules for service implementation 66 as CORBA objects. Thus, non-CORBA services are exposed to the CORBA objects.

Figure 4:
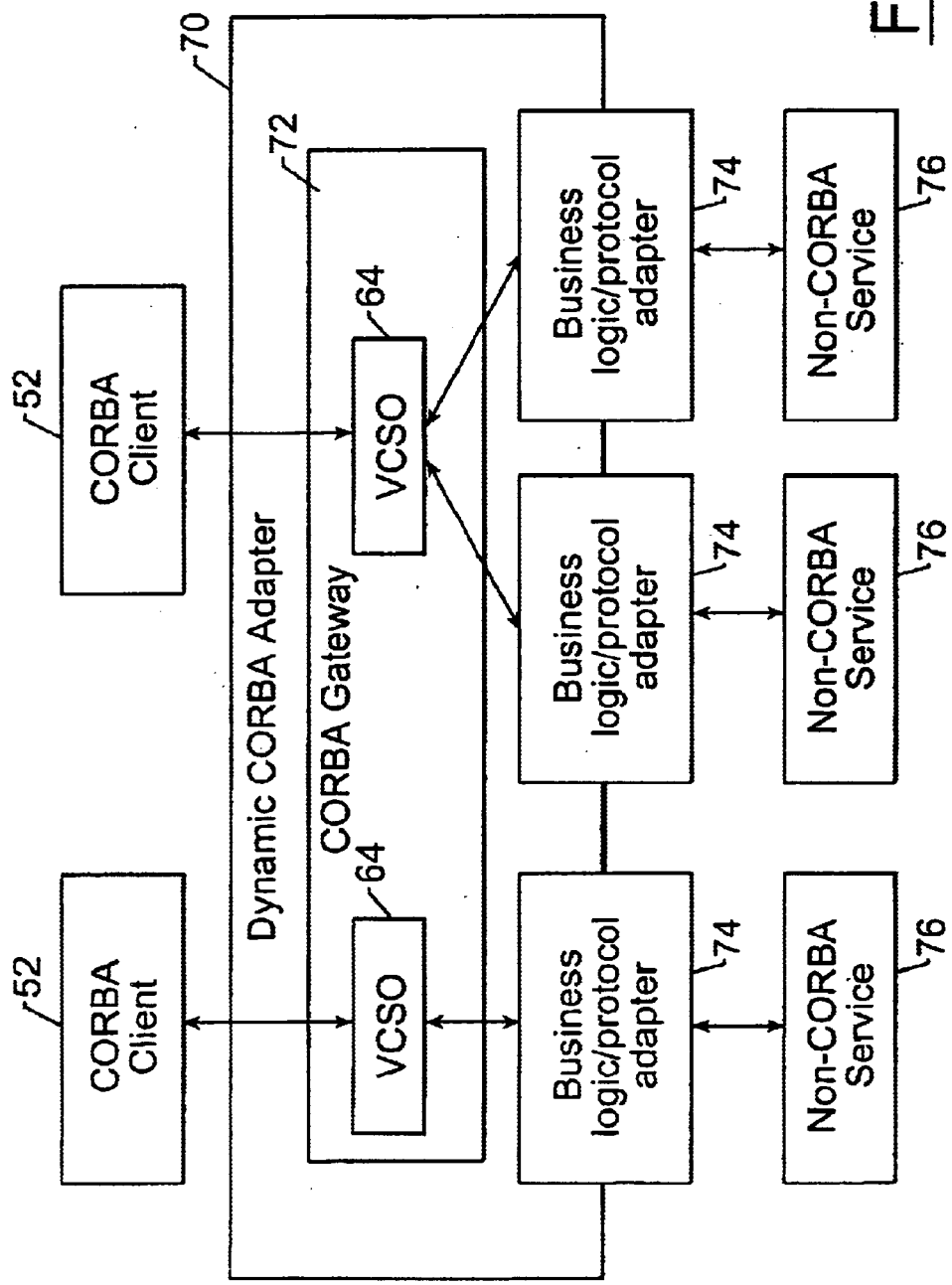
FIG. 4 is another high level block diagram of the dynamic CORBA gateway of the present invention and showing intercommunication among the CORBA clients and non-CORBA services.

Another high level block diagram of the dynamic CORBA gateway is shown in FIG. 4, showing a dynamic CORBA adapter 70, which includes the CORBA gateway 72 having the Virtual CORBA Service Object 64, operable with CORBA clients 52 and business logic/protocol adapters 74 that are written under the scripting languages and communicating with the non-CORBA services 76, which could be devices or web services. Having the gateway in the middle allows the system to separate clients and servers business logic from the CORBA communication mechanism. As a result, complex CORBA IDL processing and binding to the particular ORB is not necessary. The generic SOAP to CORBA encoding/decoding can be developed by techniques known to those skilled in the art and allows the introduction of new complex data types without modification of already deployed services.

CORBA clients 52 are accessing the "virtual services" as normal CORBA servers, parsing an IOR, and talking to the CORBA objects residing on the gateway. The gateway performs translations of the IDL method calls to SOAP messages and sends them to the specified method implementation HTTP URL.

The gateway also provides the access to remote CORBA services over the web. This allows the clients to be written on any programming and scripting language that can operate with strings and implement the HTTP client and servers. Opposite to all existing implementations, the gateway technology of the present invention allows the implementation of the callback mechanism when the CORBA object may be created on the client side and passed along the CORBA method call (over SOAP). It may be called back later by the remote CORBA server which gives the possibility of creation of a complete client.

This given approach to the dynamic CORBA interface implementation provides the architecture for generic CORBA/non-CORBA services. The adapter as described is one of the several beneficial elements introduced by the present invention.

The architecture of the present invention uses a CORBA gateway in a dynamic CORBA interface implementation. This approach allows the complete separation of business logic both for CORBA clients and servers from the CORBA communication infrastructure exposing or accessing CORBA services using SOAP over HTTP. No use of CORBA specific code and procedures is necessary to provide services through CORBA or use services exposed through CORBA. This also allows implementation of the client callback mechanism, which is not implemented by existing CORBA to SOAP systems.

The dynamic CORBA scripting system of the present invention allows the scriptable CORBA services to be implemented using SOAP over HTTP. Every CORBA service exposed through the dynamic gateway and described by the particular IDL has the corresponding HTTP URL pointing to the location where the business implementation of the service resides. This approach allows a separate URL to be specified for every IDL method, which distributes the service among many platforms at the same time and providing the one point of service access through a Virtual CORBA Service Object 64, as shown in FIG. 1.

The present invention also allows the programming of client and servers business procedures using any scripting or programming language (including CGI scripts, servlets and Java server pages), which can operate with strings and support creation of HTTP clients and servers.

The present invention also provides a generic implementation for the CORBA/non-CORBA services generic adapter architecture, which allows CORBA clients to access different non-CORBA services. For example, this architecture can provide access of distributed web services to the CORBA clients (the problem described earlier). The generic CORBA adapter uses the CORBA gateway, maintaining the Virtual CORBA Service Objects (VCSO) and the CORBA independent pluggable modules to provide the business information preprocessing, and forwarding requests to different non-CORBA services. This approach hides the actual location and nature (implementation) of the particular services from the CORBA system elements, as shown in FIG. 4.

Another advantageous result of the dynamic CORBA interface implementation of the present invention is generic SOAP/CORBA encoding/decoding protocol. The encoding/decoding of the data objects, which are passed and returned along the CORBA calls, is performed by serializing of the CORBA NV list data type to SOAP messages. This method works with any possible complex data and dynamic introduction of new IDL data types without modifications of the gateway code and the code of the existing business modules.

Figure 5:
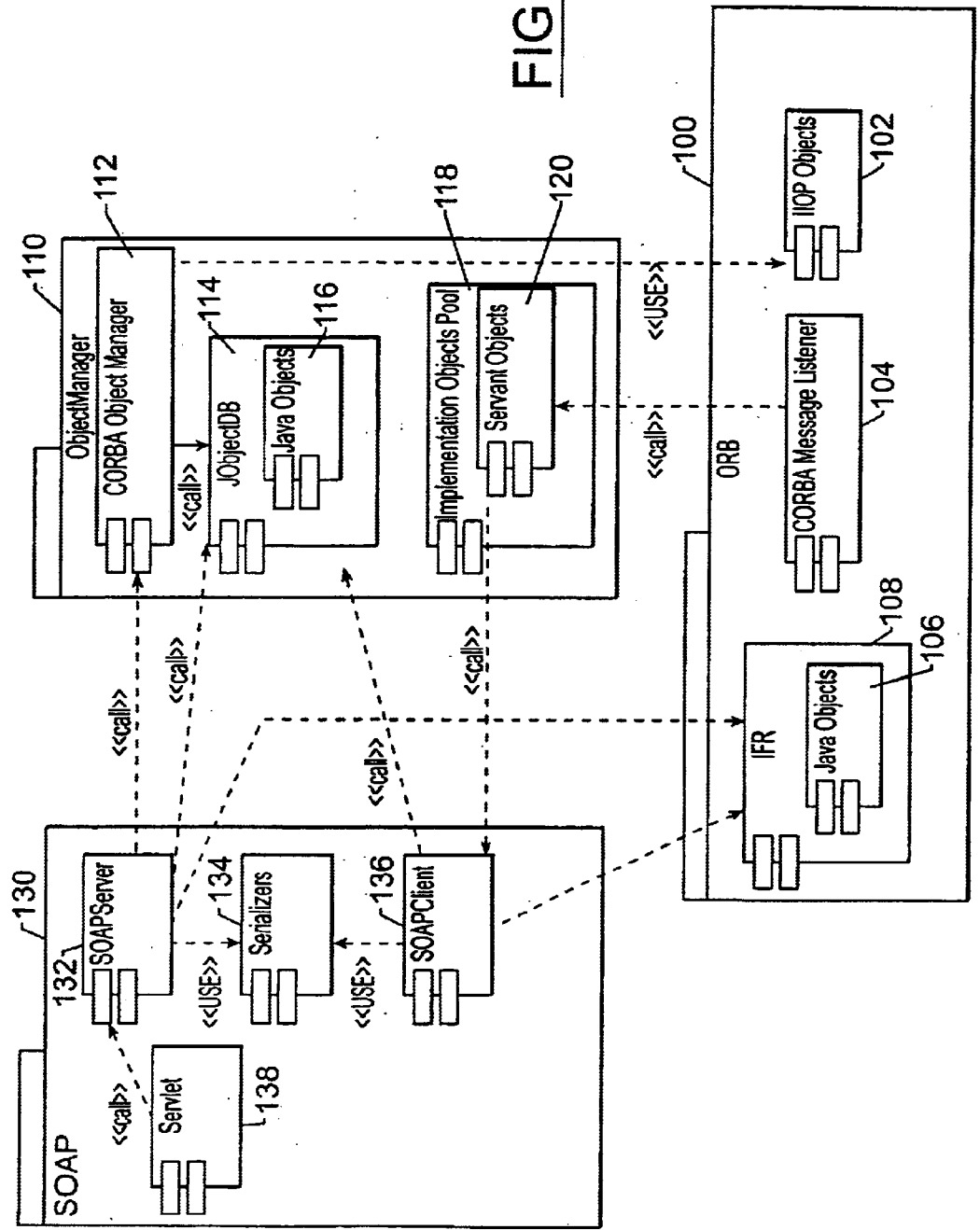
FIG. 5 is a high level block diagram showing various components of the dynamic CORBA gateway and system of the present invention.

Referring now to FIG. 5, there is illustrated a block diagram showing different components of the system architecture of the present invention that forms the dynamic CORBA gateway. Different calls and uses between the components are illustrated by the dashed lines. The object request broker (ORB) 100 includes the Internet Inter-ORB Protocol (IIOP) objects 102, a CORBA Message Listener 104 and Java objects 106 as part of the interface (IFR) 108 of the ORB 100.

The object manager 110 of the present invention separates the CORBA object manager 112 from the Java object database 114 having Java objects 116. An Implementation Objects Pool 118 includes generic Servant Objects 120 and communicates with the ORB 100. As known to those skilled in the art, the ORB 100 locates the servant object 120 for a client request and provides an object oriented RPC facility. The Simple Object Access Protocol function 130 includes a SOAP server 132, Serializers 134, a SOAP Client 136 and a Servlet 138. This Serializer 134 can be a generic serializer and convert any CORBA data type to a SOAP stream without modification of the code. The Implementation Objects Pool 118 calls the SOAP client 136 and sends a request to a non-CORBA service. The SOAP Server 132 calls the CORBA Object Manager 112 to call CORBA objects. The CORBA Message Listener 104 calls the Servant Objects 120. The SOAP Server 132 calls the CORBA Object Manager 112 and Java Object Database 114. The CORBA Object Manager 112 calls the SOAP Server 132.

Figure 6:
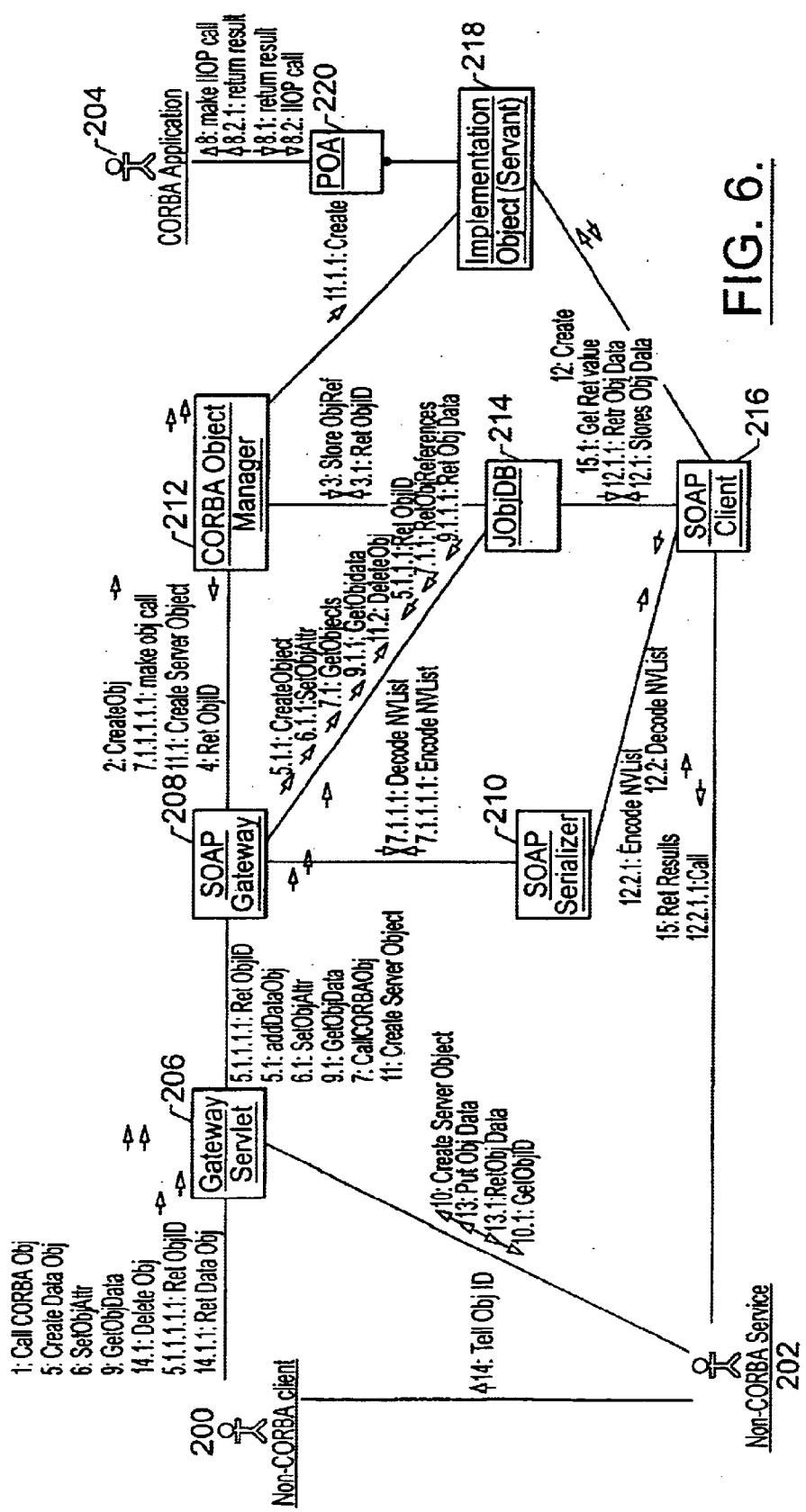
FIG. 6 is another block flow diagram showing collaboration among non-CORBA clients, non-CORBA services and CORBA applications as an example of the present invention.

FIG. 6 illustrates a high level collaboration block diagram and points out the different calls and interaction among objects. As illustrated, a non-CORBA client 200 is illustrated as operative with a non-CORBA service 202 to communicate with the CORBA application 204. The Gateway Servlet 206 is operative with the SOAP Gateway 208 and SOAP Serializer 210. The CORBA Object Manager 212 is operative with the Java Object Database 214. The SOAP client 216 is operative with the Java Object Database 214 and the Implementation Object for the Servant 218, which in turn, is operative with the Portable Object Adapter (POA) 220.

The collaboration example set forth in FIG. 6 is illustrated with sequential numbers for functional flow and described briefly. The non-CORBA client 200 can call the CORBA object through the Gateway Servlet 206 and SOAP Gateway 208 and an object is created. The CORBA Object Manager 212 is operative with the Java Object Database 214 to store the object reference and return an object ID through the SOAP Gateway 208. A data object is created and a data object added. An object is created and an object ID returned through the SOAP Gateway 208. The object attributes can be set and sent through the SOAP Gateway 208 to the Java Object Database 214. The Gateway Servlet 206 calls a CORBA object and the SOAP Gateway 208 allows the object to be obtained. Object references are returned via the Java Object Database 214. A name value list (NV List) is decoded and encoded through the SOAP Serializer 210 and SOAP Gateway 208. An object call is made by the CORBA Object Manager 212 back through the SOAP Gateway 208.

The POA 220 is operative with the Implementation Object 218 and an IIOP call is made with the result returned. Object data is obtained through the SOAP Gateway 208 and returned. A server object can be created via the Non-CORBA Service 202 and the Gateway Servlet 206 and operative with the CORBA Object Manager 212. Server objects are created and later objects are deleted via the Java Object Database 214.

In another aspect of the invention, the SOAP client 200 is operative with the Java Object Database 214 to store object data and return object data via associated components. The SOAP client 200 makes a call to the Non-CORBA Service 202 and at the same time, the SOAP client 200 is operative with the SOAP Serializer 210 to encode the name value list and decode the name value list. Object data is put via the Non-CORBA Service 202 to the Gateway Servlet 206 and object data returned. Object ID is transferred from the Non-CORBA Service to the Non-CORBA Client and object data returned. Results are returned and a return value obtained.

It is evident from the present invention that not only are CORBA services exposed to non-CORBA clients, but also non-CORBA services are exposed to CORBA clients using the dynamic CORBA gateway.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications That which is claimed is:

1. A method of communicating within a distributed object oriented computing system comprising the step of:

exposing a service that is not specified through a Common Object Request Broker Architecture (CORBA) to a client that is CORBA specified using a Simple Object Access Protocol (SOAP) message, wherein the method further comprises the step of creating and maintaining references to Virtual CORBA services via a Virtual CORBA Service Object as part of a dynamic CORBA gateway that includes at least one Business/Logic Protocol Adapter having interactive scripting for preparing SOAP requests that are transmitted over the CORBA gateway through a SOAP upstream interface operable with the CORBA gateway and a downstream interface operable for communicating with dynamic modules for service implementation as CORBA objects.

2. A method according to claim 1, and further comprising the step of preparing a SOAP request by interactive scripting as part of a client business logic function and operable via a SOAP interface.

3. A method according to claim 1, and further comprising the step of addressing the Virtual CORBA services by a set of HTTP Uniform Resource Locators (URL's).

4. A method according to claim 3, wherein the references can be exposed as a monolithic CORBA service.

5. A method according to claim 1, and further comprising the step of serializing CORBA Name Value list data types to SOAP messages.

6. A method of communicating within a distributed object oriented computing system comprising the steps of:

exposing a service that is not specified through a Common Object Request Broker Architecture (CORBA) to a client that is CORBA specified using a Simple Object Access Protocol (SOAP) message; and implementing Internet Inter-ORB Protocol (IIOP) callbacks using Simple Object Access Protocol (SOAP), wherein the method further comprises the step of creating and maintaining references to virtual CORBA services via a Virtual CORBA Service Object as part of a dynamic CORBA gateway that includes at least one Business/Logic Protocol Adapter having interactive scripting for preparing SOAP requests that are transmitted over the CORBA gateway through a SOAP upstream interface operable with the CORBA gateway and a downstream interface operable for communicating with dynamic modules for service implementation as CORBA objects.

7. A method according to claim 6, and further comprising the step of addressing the Virtual CORBA services by a set of HTTP Uniform Resource Locators (URL's).

8. A method according to claim 7, wherein the references can be exposed as a monolithic CORBA service.

9. A method according to claim 6, and further comprising the step of serializing CORBA Name Value list data types to SOAP messages.

10. A method of communicating within a distributed object oriented computing system comprising the step of:

exposing a service that is not specified through a Common Object Request Broker Architecture (CORBA) to a client that is CORBA specified using a Simple Object Access Protocol (SOAP) message;

translating Interface Definition Language (IDL) method calls to the SOAP messages; and transmitting to a specified method implementation HTTP Uniform Resource Locator (URL) via a Virtual CORBA Service Object that forms a CORBA gateway having virtual CORBA services, wherein the method further comprises the step of creating and maintaining references to virtual CORBA services via the Virtual CORBA Service Object as part of a dynamic CORBA gateway that includes at least one Business/Logic Protocol Adapter having interactive scripting for preparing SOAP requests that are transmitted over the CORBA gateway through a SOAP upstream interface operable with the CORBA gateway and a downstream interface operable for communicating with dynamic modules for service implementation as CORBA objects.

11. A method according to claim 10, and further comprising the step of addressing the Virtual CORBA services by a set of HTTP Uniform Resource Locators (URL's).

12. A method according to claim 11, wherein the references can be exposed as a monolithic CORBA service.

13. A method according to claim 10, and further comprising the step of serializing CORBA Name Value list data types to SOAP messages.

14. A distributed object computing system comprising:

a service that is not specified through a Common Object Request Broker Architecture (CORBA);

a client that is CORBA specified;

a CORBA gateway having a Simple Object Access Protocol (SOAP) interface and Virtual CORBA Service Object through which the service that is not specified through CORBA is exposed to the client that is CORBA specified;

a SOAP upstream interface operable with the CORBA gateway;

a SOAP downstream interface operable for communicating with dynamic modules for service implementation as CORBA objects; and wherein the Virtual CORBA Service Object is operable to create and maintain references to virtual CORBA services, said CORBA gateway further comprising at least one Business/Logic Protocol Adapter having interactive scripting for preparing SOAP requests that are transmitted over the CORBA gateway through the SOAP upstream interface and the downstream interface operable for communicating with dynamic modules for service implementation as CORBA objects.

15. A distributed object computing system according to claim 14, and further comprising a Dynamic Client Business Logic function operative with an Internet Inter-ORB Protocol (IIOP) callback using a SOAP message.

16. A distributed object computing system according to claim 14, wherein said Virtual CORBA Service Object is operative as a Portable Object Adapter.

17. A distributed object computing system according to claim 14, and further comprising a serializer for serializing CORBA Name Value list data types to SOAP messages.

18. A distributed object computing system according to claim 14, wherein said CORBA gateway is operative for translating Interface Definition Language method calls to SOAP messages.

* * * * *